US012651060B2

(12) United States Patent
Muramatsu et al.

(10) Patent No.: US 12,651,060 B2
(45) Date of Patent: Jun. 9, 2026

(54) ELECTRONIC CONTROL DEVICE

(71) Applicant: DENSO CORPORATION, Kariya-city (JP)

(72) Inventors: Yuki Muramatsu, Kariya-city (JP); Takenori Fujita, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 169 days.

(21) Appl. No.: 18/441,008

(22) Filed: Feb. 14, 2024

(65) Prior Publication Data

US 2024/0289439 A1 Aug. 29, 2024

(30) Foreign Application Priority Data

Feb. 23, 2023 (JP) ................................. 2023-026811

(51) Int. Cl.
G06F 21/54 (2013.01)
G06F 8/71 (2018.01)

(52) U.S. Cl.
CPC ................. G06F 21/54 (2013.01); G06F 8/71 (2013.01); *G06F 2221/033* (2013.01)

(58) Field of Classification Search
CPC ...... G06F 21/54; G06F 8/71; G06F 2221/033; G06F 8/65; G06F 21/12; G06F 21/57
See application file for complete search history.

(56) References Cited

U.S. PATENT DOCUMENTS

2014/0075197 A1* 3/2014 Alrabady ................ G06F 21/57
713/176
2016/0313987 A1* 10/2016 Son .......................... G06F 8/65

2017/0010881 A1 1/2017 Kawazu
2019/0332371 A1* 10/2019 Kobayashi ............. G07C 5/008
2020/0153682 A1* 5/2020 Nidumolu ........... H04L 41/0816
2020/0204702 A1* 6/2020 Park ................... H04N 1/32144
2021/0255805 A1* 8/2021 Harata ...................... G06F 8/65
2023/0021129 A1* 1/2023 Ni ........................... H04L 67/34
2024/0007539 A1* 1/2024 Ma .......................... H04W 4/44
2024/0095018 A1* 3/2024 Pepke ...................... G06F 8/65
2024/0119154 A1* 4/2024 Hoffman ................. G06F 21/57
2024/0184260 A1* 6/2024 Marrone ............. G05B 19/042
2025/0085955 A1* 3/2025 Miroshkin ............... G06F 8/65

FOREIGN PATENT DOCUMENTS

JP H11-282655 A 10/1999
JP 2008-112297 A 5/2008
JP 6595822 B2 10/2019

* cited by examiner

*Primary Examiner* — Oleg Survillo

(74) *Attorney, Agent, or Firm* — Harness, Dickey & Pierce, PLC

(57) ABSTRACT

An electronic control device includes: a processing device; a storage device that stores rewritable software to be executed by the processing device; and a communication device that receives distribution software for rewriting the rewritable software. The processing device includes: a version check unit that checks a version of the rewritable software and a version of the distribution software; a security determination unit that determines whether the distribution software satisfies a security standard when the version of the distribution software is not newer than the version of the rewritable software; and a rewriting unit that rewrites the rewritable software to the distribution software when the security determination unit determines that the distribution software satisfies the security standard.

3 Claims, 9 Drawing Sheets

| SEC LEV | 3 (HIGH) | 2 (MIDDLE) | 1 (LOW) |
|---|---|---|---|
| GPS INF | MANUFACT | AUTH DEALER | USER HOME CAR SPECIALTY SHOP |
| REWRITE SOFT LEV (DIST SOFT INF) | ALL SOFT | FUNC UPDATE SOFT BUG FIX SOFT | OPTION CHANGE SOFT |

FIG. 6

| SEC LEV | 3 (HIGH) | 2 (MIDDLE) | 1 (LOW) |
|---|---|---|---|
| GPS INF | MANUFACT | AUTH DEALER | USER HOME<br>CAR SPECIALTY SHOP |
| REWRITE SOFT LEV<br>(DIST SOFT INF) | ALL SOFT | FUNC UPDATE SOFT<br>BUG FIX SOFT | OPTION CHANGE SOFT |

ELECTRONIC CONTROL DEVICE

CROSS REFERENCE TO RELATED APPLICATION

The present application claims the benefit of priority from Japanese Patent Application No. 2023-026811 filed on Feb. 23, 2023. The entire disclosure of the above application is incorporated herein by reference.

TECHNICAL FIELD

The present disclosure relates to an electronic control device.

BACKGROUND

An information processing device according to a conceivable technique 1 is an example of an electronic control device. The information processing device updates the software using the update software when it is determined that the version of the update software is newer than the current software version. On the other hand, the information processing device suspends software rewriting when it is not determined that the update software version is newer than the current software version.

SUMMARY

According to an example, an electronic control device may include: a processing device; a storage device that stores rewritable software to be executed by the processing device; and a communication device that receives distribution software for rewriting the rewritable software. The processing device includes: a version check unit that checks a version of the rewritable software and a version of the distribution software; a security determination unit that determines whether the distribution software satisfies a security standard when the version of the distribution software is not newer than the version of the rewritable software; and a rewriting unit that rewrites the rewritable software to the distribution software when the security determination unit determines that the distribution software satisfies the security standard.

BRIEF DESCRIPTION OF THE DRAWINGS

The above and other objects, features and advantages of the present disclosure will become more apparent from the following detailed description made with reference to the accompanying drawings. In the drawings:

FIG. 6 is a flow chart showing security levels;

DETAILED DESCRIPTION

As described above in the conceivable technique, in the information processing device, the rewriting of the software is suspended when the version of the update software is newer than the current version of the software. Therefore, in the information processing device, there is a difficulty that the version of the software cannot be downgraded.

One object of the embodiments is to provide an electronic control device in which software can be downgraded.

The electronic control device according to the present disclosure is an electronic control device includes a processing device, a storage device storing rewritable software to be executed by the processing device, and a communication device receiving distribution software for rewriting the software.

The processing device includes:

a version check unit for checking a version of software and a version of distribution software;

a security determination unit for determining whether or not the distribution software satisfies a security standard when the version of the distribution software is not newer than the version of the software; and a rewriting unit for rewriting the software to the distribution software when it is determined that the security standard is satisfied.

In this way, the electronic control device can rewrite the software to the distribution software even if the distribution software is not a new version, as long as the security standard is satisfied. Therefore, the electronic control device can rewrite the software to the distribution software even if the distribution software is the downgraded software.

Embodiments

An embodiment for carrying out the present disclosure is hereinafter described with reference to the drawings. In this embodiment, as an example, an electronic control device (i.e., ECU, Electronic Control Unit) 100 that can be mounted on a vehicle is employed. A vehicle is equipped with a plurality of electronic control devices having different control targets. The electronic control device 100 is one of them. Of the plurality of electronic control devices, electronic control devices other than the electronic control device 100 are also referred to as other control devices.

<Configurations>

Figure 1:
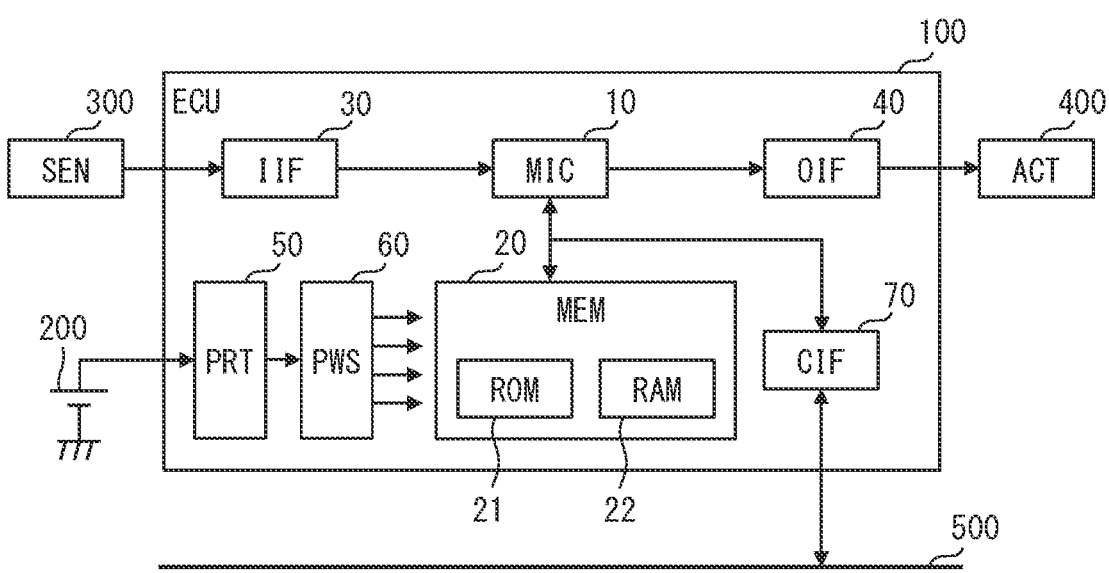
FIG. 1 is a block diagram showing a configuration of an ECU.

As shown in FIG. 1, the electronic control device 100 includes a microcomputer 10, a memory 20, an input interface 30, an output interface 40, a protection element 50, an internal power supply 60, a communication interface 70, and the like.

The microcomputer (i.e., MIC) 10 is supplied electric power form the internal power supply 60 and becomes operable. The microcomputer 10 is configured to be able to execute software stored in the ROM 21 of the memory 20. The microcomputer 10 performs various calculation processing by executing software. The microcomputer 10 uses data stored in the RAM 22 of the memory 20 and sensor signals input via the input interface 30 when performing calculation processing. The microcomputer 10 outputs the calculation result as a control signal through the output interface 40. Here, the microcomputer 10 may be also defined as a processor. The microcomputer 10 corresponds to a processing device.

The memory (i.e., MEM) 20 includes a ROM 21, a RAM 22, and the like. The ROM 21 stores software and the like in a rewritable manner. EEPROM (registered trademark), flash memory, or the like can be used as the ROM 21. The RAM 22 temporarily stores data used by the microcomputer 10 for calculation processing. The ROM 21 corresponds to a storage device.

Figure 2:
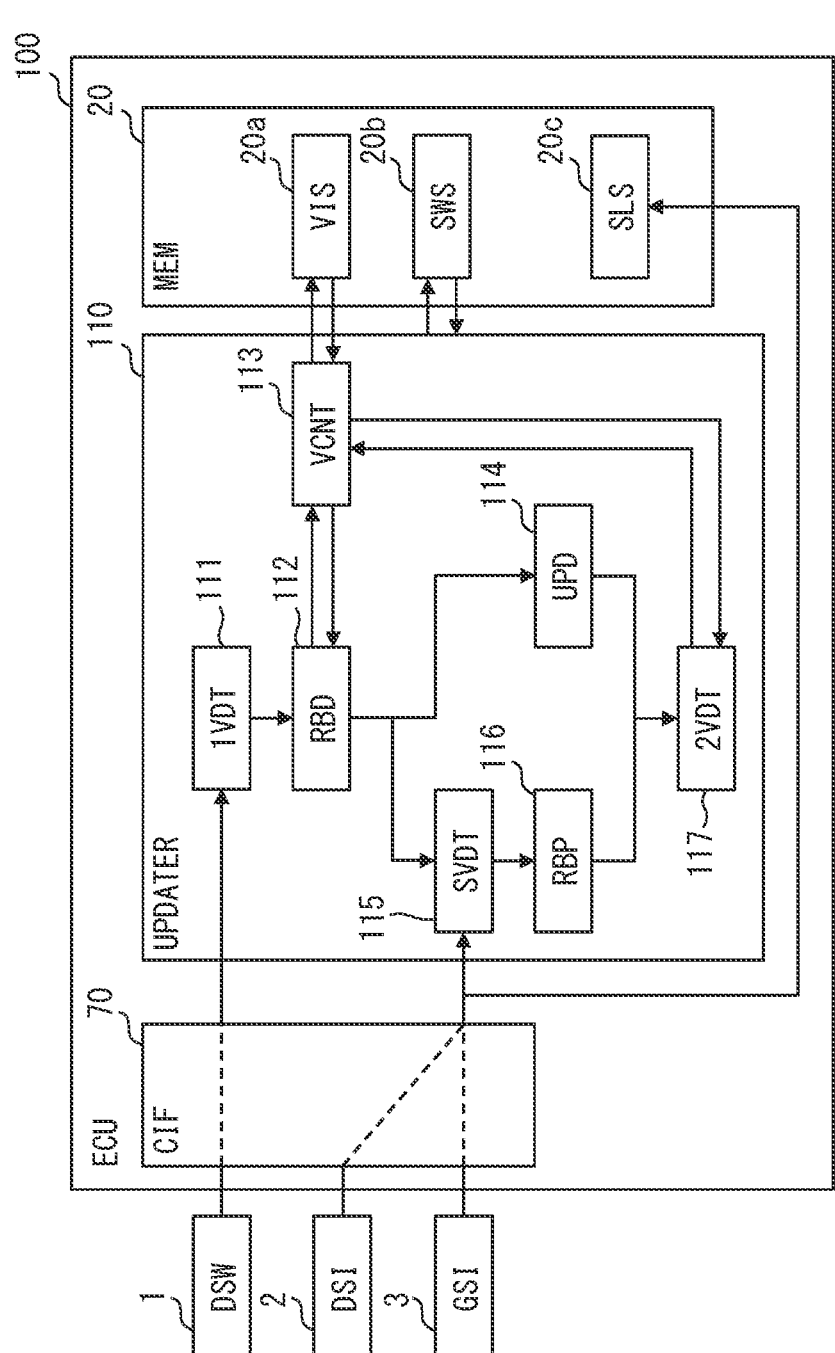
FIG. 2 is a functional block diagram showing functions of an ECU.

As shown in FIG. 2, the ROM 21 includes a version information storage unit 20a, a software storage unit 20b, and a security level list storage unit 20c. In FIG. 2, the version information storage unit 20a is denoted as VIS, the software storage unit 20b as SWS, and the security level list storage unit 20c as SLS.

Version information (i.e., version number) of software stored in the ROM 21 is stored in the version information storage unit 20a. The software storage unit 20b stores software. The software stored in the software storage unit 20b is hereinafter simply referred to as software. The security level list storage unit 20c stores a security level list (i.e., SLL). The security level list storage unit 20c corresponds to a list storage unit.

The electronic control device 100 is configured so that software can be rewritten with distribution software 1 distributed from a rewriting device provided outside the vehicle. Thus, the electronic control device 100 is configured so that software can be reprogrammed.

The distribution software 1 includes not only newer versions than the software, but also older versions. That is, the software in the electronic control device 100 can be upgraded by rewriting the software stored in the software storage unit 20b with the distribution software 1 of the new version. Further, the software in the electronic control device 100 can be rolled back by rewriting the software stored in the software storage unit 20b with the distribution software 1 of the old version. However, when rewriting with an old version of the distribution software 1, it is necessary to satisfy the security standard described later. Here, the electronic control device 100 may rewrite the software to the distribution software 1 of the same version. This case may also be regarded as a rollback.

Figure 7:
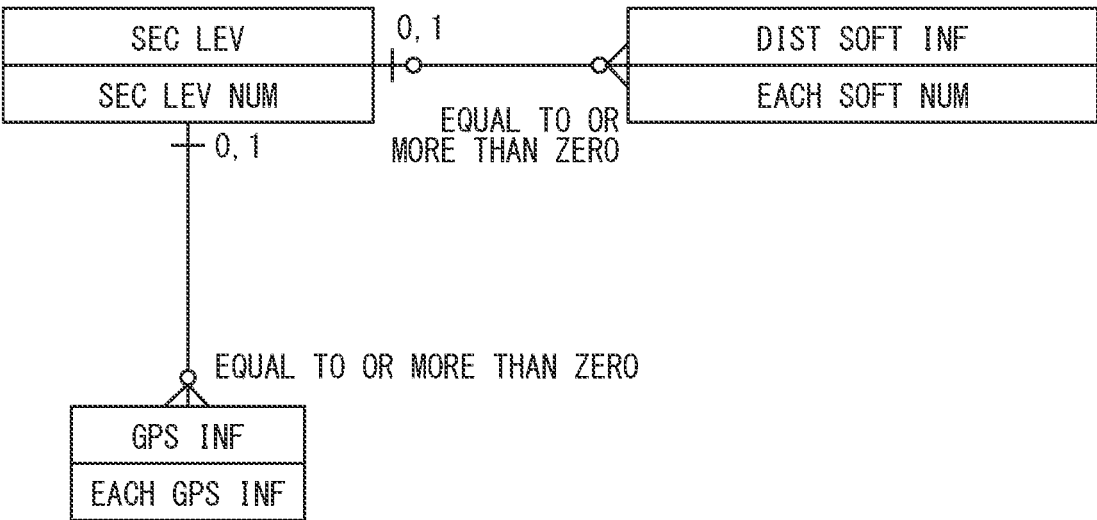
FIG. 7 is a drawing showing item relationships of security levels.

Here, the security level list will be described with reference to FIGS. 6 and 7. The security level list defines the relationship between a plurality of pieces of GPS information 3, the security level (i.e., SL) of each piece of the GPS information 3, and the type of the distribution software 1 corresponding to each security level. Here, the type can be rephrased as the rewriting software level of the distribution software 1.

The security level list includes security level, GPS information 3, and distributed software information 2 as items. The relationship of each item is as shown in FIG. 7. The version number of the software is included in the distributed software information 2 and differs for each type of distributed software 1. Therefore, the type can be determined by the version number. Also, the distribution software information 2 may include information indicating the type of the distributed software 1 in addition to the version number.

GPS information corresponds to location information. In FIG. 2 and the like, the distribution software 1 is indicated as DSW, the distribution software information 2 is indicated as DSI, and the GPS information 3 is indicated as GSI.

FIG. 6 shows an example of the security level list. The security level list has three levels of security levels 1-3.

Level 3 is the highest security level. Level 3 defines information indicating the position of the vehicle manufacturer as the GPS information 3 and information indicating all distribution software 1 as the type. In other words, if the current location of the electronic control device 100 is disposed in the manufacturer, it can be considered that all the distribution software 1 satisfies the security standard. Level 3 corresponds to a high level.

Level 2 is a security level lower than the high level. Level 2 defines information indicating the location of a vehicle dealer (i.e., authorized dealer) as GPS information and information indicating either distribution software 1 regarding function update or distribution software 1 regarding bug fix as the type. That is, when the current location of the electronic control device 100 is disposed in a dealer and the type of the distribution software 1 indicates function update, it can be considered that the security standard is satisfied. Level 2 corresponds to a middle level.

Level 1 is a security level lower than the middle level. Level 1 defines information indicating the position of the user's home as GPS information and information indicating the distribution software 1 related to option change as the type. The location information may also include information indicating the location of a pre-registered car specialty shop. That is, when the current position of the electronic control device 100 is disposed in the user's home and the type of the distributed software 1 indicates option change, it can be considered that the security standard is satisfied. Level 1 corresponds to a low level.

In addition, in the case of the type of security level lower than the security level of the location information, it can be considered that the security standard is satisfied. In other words, if the location information indicates an authorized dealer, even if the type indicates the distribution software 1 related to option change, the security standard is satisfied.

Now, return to the description of FIG. 1. The input interface (i.e., IIF) 30 is connected with the sensor (i.e., SEN) 300. The input interface 30 receives a sensor signal output from the sensor 300. The microcomputer 10 performs calculation processing using the sensor signal. The sensor 300 is an output device that outputs a signal that the microcomputer 10 uses for calculation. Here, the input interface 30 may be connected to an output device other than the sensor 300.

The output interface (i.e., OIF) 40 is connected with the actuator (i.e., ACT) 400. The electronic control device 100 outputs a control signal generated by the microcomputer 10 via the output interface 40. The actuator 400 is a control target of the electronic control device 100. Therefore, the actuator 400 can also be defined as the target device. Here, the output interface 40 may be connected to a target device other than the actuator 400.

The protection element (i.e., PRT) 50 is connected to battery 200 and internal power supply (i.e., PWS) 60. The protection element 50 is an element for preventing overvoltage from being applied from the battery 200.

The internal power supply (i.e., PWS) 60 generates electric power to be used inside the electronic control device 100 and supplies it to the microcomputer 10 and the like. The internal power supply 60 is supplied with electric power from the battery 200 via the protection element 50. The internal power supply 60 generates electric power for use inside the electronic control device 100 from the electric power from the battery 200.

The communication interface (i.e., CIF) 70 is connected with the communication line 500. The communication interface 70 is a communication device that communicates with other control devices and the like via the communication line 500. The communication interface 70 receives the distribution software 1 for rewriting the software stored in the ROM 21 and the like. The electronic control device 100 can receive the distribution software 1 and the like from a rewriting device via the communication line 500 at a vehicle manufacturer, a dealer, or the like. In other words, it can be said that the rewriting device is provided outside the vehicle, such as at a manufacturer or a dealer.

The electronic control device 100 can receive the distribution software information 2 indicating the type of the distribution software 1 and the GPS information 3 indicating the current position of the electronic control device 100 in addition to the distribution software 1. The GPS information 3 is information indicating the current position of the vehicle when the electronic control device 100 is mounted on the vehicle.

Here, communication conforming to the CAN (registered trademark) protocol can be adopted here. In this case, the communication interface 70 is a CAN interface. The communication interface 70 corresponds to a communication device.

The electronic control device 100 may include a wireless communication device as the communication device. In this case, the electronic control device 100 can communicate with an external center provided outside the vehicle and equipped with a rewriting device via a wireless communication device. The electronic control device 100 can wirelessly receive the distribution software 1 and the like by including a wireless communication device. That is, the electronic control device 100 can rewrite the software using OTA (i.e., Over the Air) function.

<Functional Block, Processing Operation>

Figure 3:
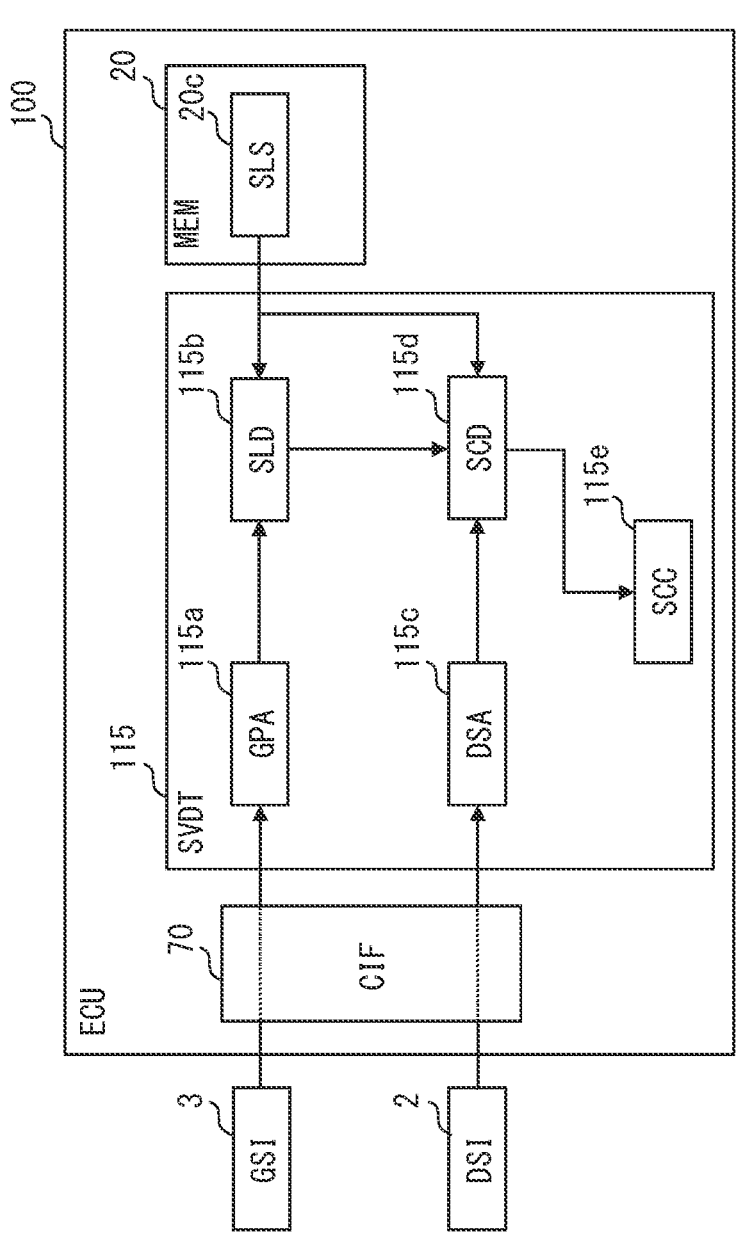
FIG. 3 is a functional block diagram showing functions of a security verification unit.

Here, functional blocks and processing operations of the electronic control device 100 will be described with reference to FIGS. 2 to 5. The electronic control device 100 provides various functions for the microcomputer 10 to perform calculation processing. FIGS. 2 and 3 show various functional blocks showing the relationship between various functions. As shown in FIG. 2, the microcomputer 10 has an updater 110 for rewriting the software as a functional block.

Figure 4:
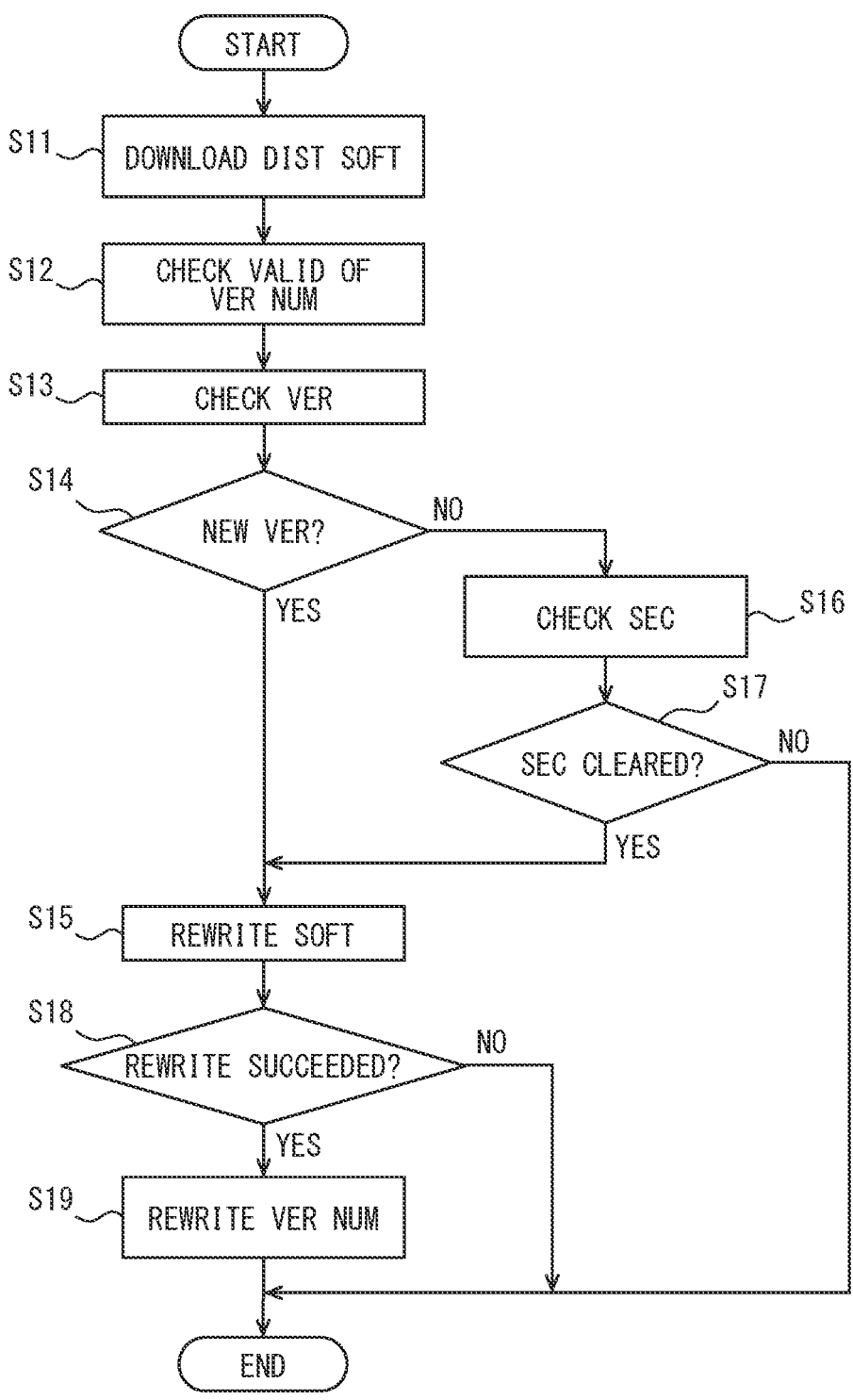
FIG. 4 is a flow chart showing the operation of an ECU.

When receiving a software update request from the rewriting device, the microcomputer 10 starts the processing shown in the flowchart of FIG. 4.

In step S11, the distribution software 1 is downloaded. The microcomputer 10 downloads via the communication interface 70. Hereinafter, the downloaded distribution software 1 is simply referred to as the distribution software 1 as well.

In step S12, the validity of the version number is checked. The first verification unit (i.e., 1VDT) 111 confirms whether the version number of the distribution software 1 is proper. Here, the version number is assigned to the distribution software 1. Therefore, the first verification unit 111 can confirm the validity by referring to the distribution software 1. When the microcomputer 10 determines that the version number is not proper, the flowchart of FIG. 4 may be terminated.

In step S13, the version is checked. Here, it is confirmed whether the distribution software 1 is for version upgrade or version downgrade. The rollback detection unit (i.e., RBD) 112 checks the version of the software and the version of the distribution software 1. At this time, the version management unit (i.e., VCNT) 113 reads the software version number from the version information storage unit (i.e., VIS) 20*a* and outputs it to the rollback detection unit 112. That is, the rollback detection unit 112 refers to the version number stored in the version information storage unit 20*a* via the version management unit 113. The rollback detection unit 112 compares the version number of the software with the version number of the distribution software 1. The rollback detection unit 112 corresponds to a version check unit.

In step S14, it is confirmed whether or not the version is new. The rollback detection unit 112 compares the version number of the software with the version number of the distribution software 1. When the version number of the distribution software 1 is newer than the version number of the software, the rollback detection unit 112 determines that the version is new. Also, the rollback detection unit 112 does not determine that the version is new when the version number of the distribution software 1 is not newer than the version number of the software. If the microcomputer 10 determines that it is the new version, it proceeds to step S15, and if it determines that it is not the new version, it proceeds to step S16.

In step S16, security check is performed. The security verification unit (i.e., SVDT) 115 confirms whether or not the security clear is confirmed based on the relationship between the type of the distribution software 1 and the current position, that is, whether or not the security standard is satisfied. Thus, the security determination unit 115 determines whether or not the distribution software 1 satisfies a security standard when the version of the distribution software 1 is not newer than the version of the software; and The security verification unit 115 corresponds to a security determination unit.

Here, security check processing will be described with reference to FIGS. 3 and 5. The security verification unit 115 includes each functional block shown in FIG. 3.

In step S20, the GPS information 3 is acquired. The GPS information acquisition unit (i.e., GPA) 115*a* acquires the GPS information 3 indicating the current position of the electronic control device 100. The GPS information acquisition unit 115*a* acquires the GPS information 3 from a navigation control device or the like, which is one of other control devices, through the communication interface 70. The GPS information acquisition unit 115*a* corresponds to a first acquisition unit. The GPS information 3 corresponds to current location information.

In step S21, the GPS information 3 is verified with the security level list stored in the electronic control device 100. The security level verification unit (i.e., SLD) 115*b* verifies the GPS information 3 with the security level list stored in the security level list storage unit 20*c*.

In step S22, the security level is determined. The security level verification unit 115*b* determines the security level of the GPS information 3, that is, the security level of the current position of the electronic control device 100. That is, the security level verification unit 115*b* determines the security level associated with the GPS information 3 in the security level list. The security level verification unit 115*b* corresponds to a determination unit and a first determination unit.

In step S23, the distribution software information 2 is acquired. The distribution software information acquisition unit (i.e., DSA) 115*c* acquires the distribution software information 2. In other words, the distributed software information acquisition unit 115*c* acquires the type of the distribution software 1 or the version number indicating the type of the distributed software 1. The distribution software information 2 here is information in the distribution software 1 downloaded in step S11. The distribution software information acquisition unit 115*c* corresponds to a second acquisition unit.

In step S24, the distribution software information 2 and the security level are verified with the security level list stored in the electronic control device 100. The security clearance verification unit (i.e., SCD) 115*d* verifies the distribution software information 2 acquired in step S23 and the security level determined in step S22 with the security level list stored in the security level list storage unit 20*c*. That is, the security clearance verification unit 115*d* verifies the type of the distribution software 1 and the security level of the GPS information 3 with the security level list. The security clearance verification unit 115*d* corresponds to a determination unit and a second determination unit.

In step S25, it is determined whether or not the location (i.e., the GPS information 3) and distribution software 1 are a proper combination. The security clearance verification unit 115*d* determines that the distribution software 1 satisfies the security standard when the combination of the acquired GPS information 3 and the acquired type is proper. Also, if the combination of the acquired GPS information 3 and the acquired type is not proper, the microcomputer 10 determines that the distribution software 1 does not satisfy the security standard.

Therefore, the security clearance verification unit 115*d* uses the result of verification in step S24 to determine whether the relationship between the security level of the type and the security level of the GPS information 3 satisfies the relationship specified in the security level list.

The security clearance verification unit 115*d* determines that the combination of the GPS information 3 and the type is proper when the relationship between the security level of the type and the security level of the GPS information 3 satisfies the relationship defined by the security level list. Therefore, the security clearance verification unit 115*d* determines that the distribution software 1 satisfies the security standards.

On the other hand, the security clearance verification unit 115*d* determines that the combination of the GPS information 3 and the type is not proper when the relationship between the two security levels does not satisfy the relationship defined by the security level list. Therefore, the security clearance verification unit 115*d* determines that the distribution software 1 does not satisfy the security standards.

For example, if the GPS information 3 indicates the location of an inside the manufacturer, all types of the distribution software 1 satisfy the security standard. If the GPS information 3 indicates the location of an authorized dealer, the distribution software 1 whose type is the bug fix software satisfies the security standard. However, if the GPS information 3 indicates the location of the user 7*s* home, the distribution software 1 whose type is the bug fix software does not satisfy the security standard.

In step S26, it is determined that the security has been cleared. The security clearance determination unit (i.e., SCC) 115*e* determines that the security is cleared, that is, the security standard is satisfied, according to the verification result of the security clearance verification unit 115*d*. Here, if the combination is proper, the security clearance determination unit 115*e* causes the RAM 22, for example, to store information indicating that the security standard is satisfied.

Figure 5:
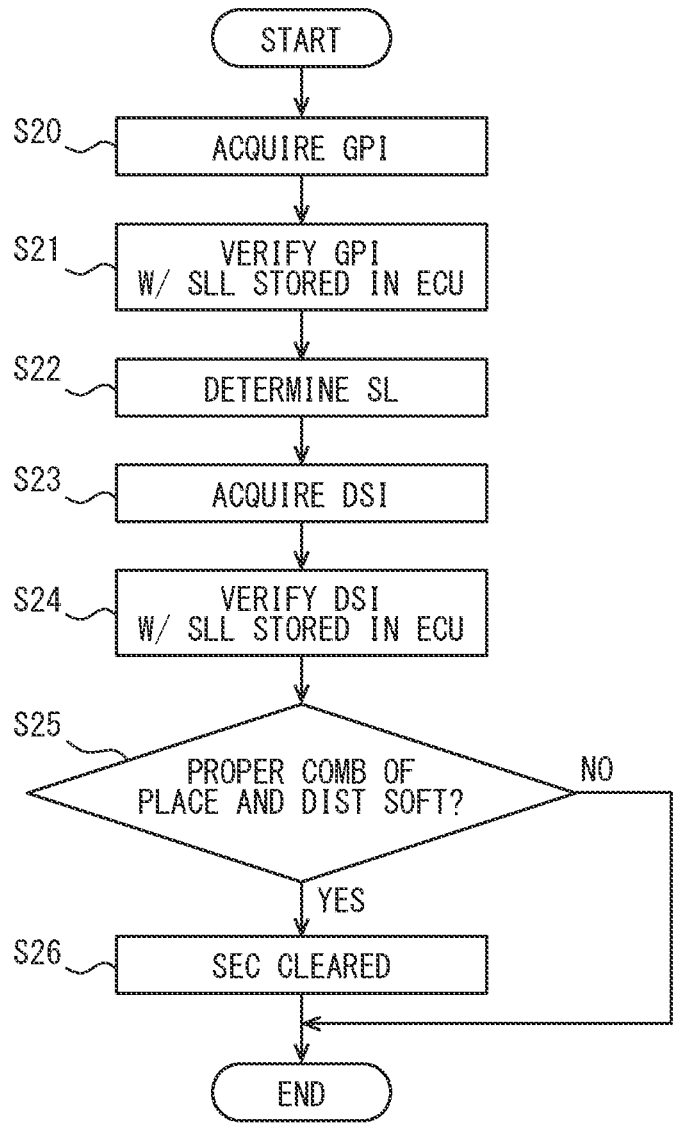
FIG. 5 is a flow chart showing the operation of a security verification unit.

Here, the microcomputer 10 may proceed to step S15 when the determination in step S25 is "YES", and terminate the flowcharts of FIGS. 4 and 5 when the determination is "NO".

Here, it returns to the flowchart of FIG. 4. In step S17, it is checked whether or not the security has been cleared. In step S16, the security verification unit 115 determines whether or not a verification result has been acquired indicating that the security has been cleared. If the RAM 22 or the like stores information indicating that the security standard is satisfied, the security verification unit 115 determines that the security has been cleared. If the RAM 22 or the like does not store information indicating that the security standard is satisfied, the security verification unit 115 does not determine that the security has been cleared. If the microcomputer 10 determines that the security has been cleared, the process proceeds to step S15, and if it does not determined that the security has been cleared, the flow chart of FIG. 4 ends. In other words, the microcomputer 10 does not rewrite the software with the distribution software 1 for which the security has not been cleared. If the capacity of the RAM 22 is small, the distribution software 1 may be temporarily written in the ROM 21, and the use of the distribution software 1 may be permitted at the time when the security is cleared.

In step S15, the software is rewritten. If the determination in step S14 is "YES", the update unit (i.e., UPD) 114 rewrites the software. The update unit 114 rewrites the software stored in the software storage unit 20*b* with the distribution software 1.

On the other hand, if the determination in step S14 is "NO", the rollback unit (i.e., RBP) 116 rewrites the software. The rollback unit 116 rewrites the software stored in the software storage unit 20*b* with the distribution software 1. If the determination in step S14 is "NO", there is a possibility of a rollback attack. Therefore, the rollback unit 116 rewrites the software only when it is determined in steps S16 and S17 that the security standard is satisfied. The rollback unit 116 corresponds to a rewriting unit.

In step S18, it is determined whether or not the rewriting is successful. The second verification unit (i.e., 2VDT) 117 determines whether or not the software stored in the software storage unit 20*b* has been successfully rewritten. The microcomputer 10 proceeds to step S19 if it determines that the process has succeeded, and terminates the flowchart of FIG. 4 if it does not determine that the process has succeeded. Here, the method of determining whether or not the rewriting has succeeded may not be particularly limited.

In step S19, the version information is rewritten. The version management unit 113 rewrites the version number stored in the version information storage unit 20*a* with the version number of the distribution software. As a result, the version number of the software stored in the software storage unit 20*b* matches the version number stored in the version information storage unit 20*a*.

Effects

In this way, the electronic control device 100 can rewrite the software to the distribution software 1 even if the distribution software 1 is not a new version, as long as the security standard is satisfied. Therefore, the electronic control device 100 can rewrite the software to the distribution software 1 even if the distribution software 1 is the downgraded software. That is, the electronic control device 100 can perform the rollback operation on the condition that the security standard is satisfied. Therefore, the electronic control device 100 can downgrade the software while preventing rollback attacks.

Since the electronic control device 100 can perform the rollback operation on the condition that the security standard is satisfied, it is possible to flexibly handle the device 100 by the user and the developer. For example, the electronic control device 100 can rewrite the software at the user's home even if the option change distribution software 1 is downgraded. Also, the electronic control device 100 can prevent rejection of software rewriting on the grounds of version downgrade. Also, the electronic control device 100 can increase options for software customization.

The electronic control device 100 uses the security level list in which the three security levels are set as described above to determine whether or not the security standard is satisfied. Therefore, the electronic control device 100 can realize a safe rollback operation by a combination of an appropriate location and the distribution software 1.

Furthermore, the electronic control device 100 stores a security level list in its own memory 20. For this reason, the electronic control device 100 only needs to perform the installation operation of the security level list and the security verification unit 115, and the like, and the verification operation thereof for only one electronic control device 100. That is, the electronic control device 100 can reduce the operation load of the installation operation and the verification operation compared to the modified example described later.

Modifications

Figure 8:
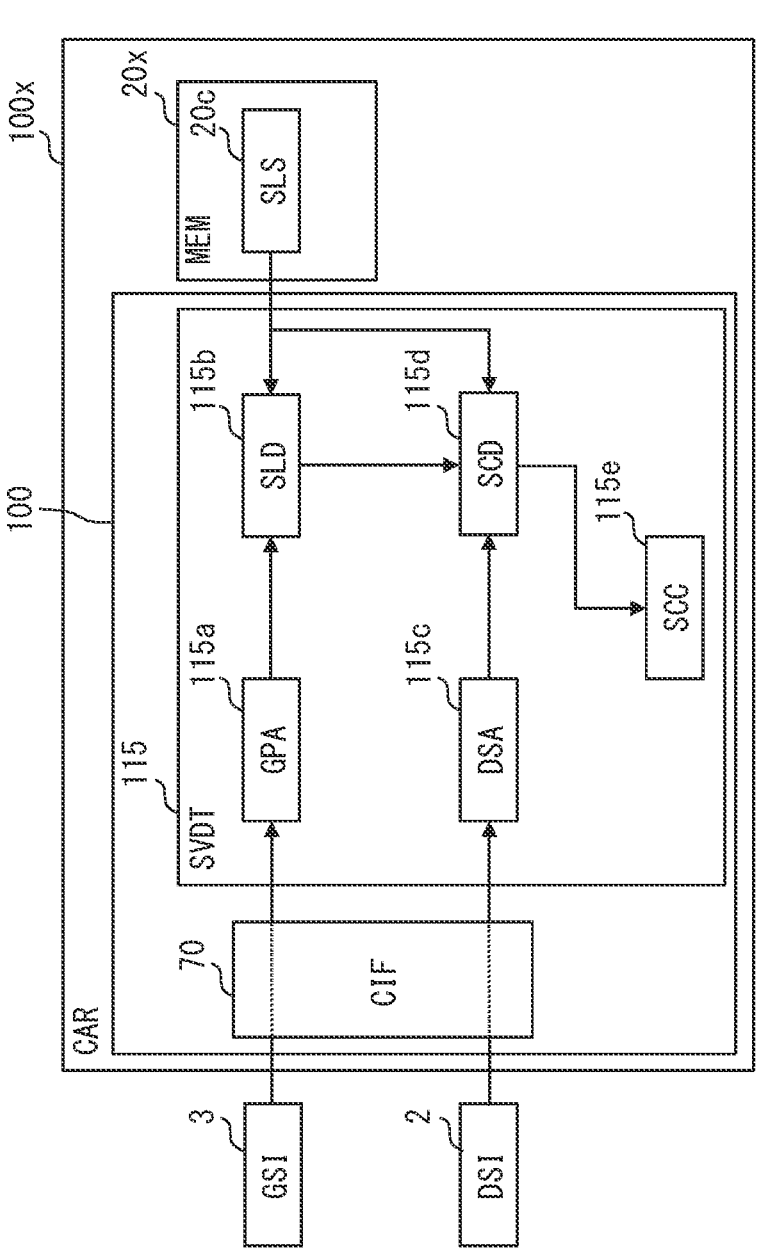
FIG. 8 is a functional block diagram showing functions of a security verification unit in a modified example.

Here, a modified example of the electronic control device 100 will be described with reference to FIGS. 8 and 9. As shown in FIG. 8, a vehicle (i.e., CAR) 100x is provided with a memory 20x outside the electronic control device 100. The memory 20x is provided in another control device such as the master control device. The security level list storage unit 20c is provided in the memory 20x.

Also, the vehicle control system includes a plurality of electronic control devices configured to be able to communicate with each other. The vehicle control system includes an electronic control device 100 and a memory 20x to provide a master control function.

The security level verification unit 115b and the security clearance verification unit 115d are configured to be able to access the memory 20x. In other words, the security level verification unit 115b and the security clear verification unit 115d are configured to be able to refer to the security level list in the security level list storage unit 20c stored in the memory 20x.

Figure 9:
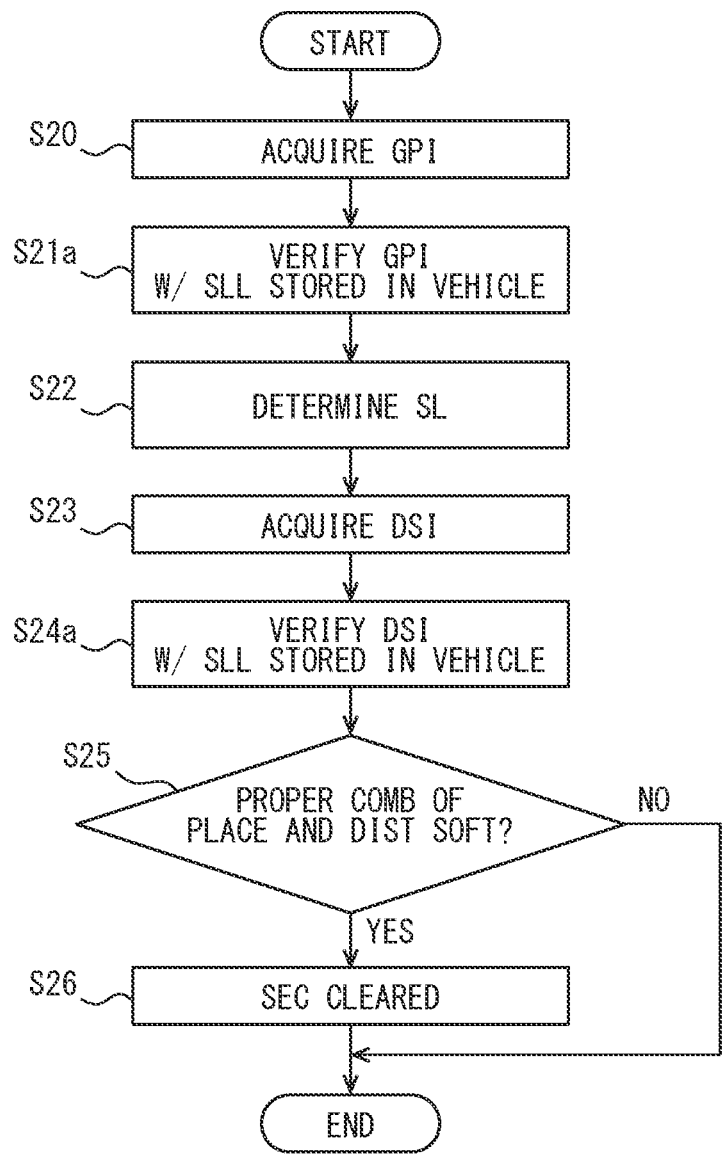
FIG. 9 is a flow chart showing operations of a security verification unit in a modified example.

As shown in FIG. 9, in step S21a, the security level verification unit 115b verifies the GPS information 3 with a security level list stored in the vehicle 100x. In step S24a, the security clearance verification unit 115d verifies the distribution software information 2 and the security level with a security level list stored in the vehicle 100x.

Therefore, the electronic control device 100 does not need to store the security level list in the memory 20. Therefore, the electronic control device 100 does not need to reduce functions for the security level list. Also, the electronic control device 100 can install the security level list without depending on the size of the memory 20. Additionally, the vehicle control system can share the security level list with multiple electronic control devices. The electronic control device 100 of the modification can achieve similar effects as those of the above embodiment.

The example embodiment of the present disclosure has been described above. Alternatively, the present disclosure may not be limited to the above embodiments. Various modifications may be made without departing from the scope and spirit of the present disclosure.

Although the present disclosure has been described in accordance with the foregoing embodiments, it is understood that the present disclosure is not limited to the above embodiments or structures. The present disclosure also includes various modification examples or variations within the scope of equivalents. In addition, while the various elements are shown in various combinations and configurations, which are exemplary, other combinations and configurations, including more, less or only a single element, are also within the spirit and scope of the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

What is claimed is:

1. An electronic control device comprising:
   a processing device;
   a storage device that stores rewritable software to be executed by the processing device; and
   a communication device that receives distribution software for rewriting the rewritable software, wherein:
   the processing device includes:
   a version check unit that checks a version of the rewritable software and a version of the distribution software;
   a security determination unit that determines whether the distribution software satisfies a security standard when the version of the distribution software is not newer than the version of the rewritable software; and
   a rewriting unit that rewrites the rewritable software to the distribution software when the security determination unit determines that the distribution software satisfies the security standard;
   the security determination unit includes:
   a first acquisition unit that acquires current position information indicating a current position of the electronic control device;
   a second acquisition unit that acquires distribution software information indicating a type of the distribution software; and
   a determination unit that determines that the distribution software satisfies the security standard when a combination of the current position and the type is proper, and determines that the distribution software does not satisfy the security standard when the combination is not proper;
   the determination unit is configured to refer a list storage unit that stores a security level list defining a relationship between a plurality of pieces of the position information, a security level of each piece of the position information, and the type of the distribution software corresponding to each security level;

the determination unit includes:

a first determination unit that verifies the current position with the security level list, and determines the security level of the current position; and a second determination unit that verifies the type and the security level that is a determination result of the first determination unit with the security level list, and determines a relationship between the security level of the type and the security level that is the determination result;

the second determination unit determines that the combination is proper when the relationship between the security level of the type and the security level that is the determination result satisfies the relationship defined in the security level list, and determines that the combination is not proper when the relationship between the security level of the type and the security level does not satisfy the relationship defined in the security level list;

the electronic control device is mounted on a vehicle; and the security level list has three levels of security levels;

a high level, which is a highest security level, defines information indicating a location of a manufacturer of the vehicle as the position information and information indicating all the distribution software as the type;

a middle level, which is a security level lower than the high level, defines information indicating a location of a dealer of the vehicle as the position information and information indicating either function update or bug fix; and a low level, which is a security level lower than the middle level, defines information indicating a location of an user's home as the position information and information indicating an option change as the type.

2. The electronic control device according to claim 1, wherein:

the list storage unit is provided in the storage device.

3. The electronic control device according to claim 1 wherein:

the list storage unit is provided in another control device different from the electronic control device mounted on the vehicle.

* * * * *